United States Patent [19]

Lehner et al.

[11] Patent Number: 5,064,721

[45] Date of Patent: Nov. 12, 1991

[54] MAGNETIC RECORDING MEDIA

[75] Inventors: August Lehner, Roedersheim-Gronau; Albert Kohl, Laumersheim; Hermann Roller, Ludwigshafen; Werner Lenz, Duerkheim; Ludwig Kreitner, Heppenheim; Helmut Kopke, Weisenheim; Friedrich Sommermann, Kehl; Ernst Ricker, Bretzfeld-Gedde, all of Fed. Rep. of Germany

[73] Assignee: BASF Aktiengesellschaft, Ludwigshafen, Fed. Rep. of Germany

[21] Appl. No.: 264,342

[22] Filed: Oct. 31, 1988

[30] Foreign Application Priority Data

Oct. 31, 1987 [DE] Fed. Rep. of Germany ....... 3736998

[51] Int. Cl.$^5$ ............................................. G11B 23/00
[52] U.S. Cl. ................. 428/425.9; 428/694; 428/900
[58] Field of Search .............. 428/425.9, 694, 900; 369/275

[56] References Cited

U.S. PATENT DOCUMENTS

| | | |
|---|---|---|
| 2,871,218 | 1/1959 | Schollenberger . |
| 4,320,171 | 3/1982 | Motz et al. ............... 428/900 |
| 4,439,486 | 3/1984 | Yamada et al. ............ 428/425.9 |
| 4,511,484 | 4/1985 | Anonuma et al. ........... 428/900 |
| 4,546,035 | 10/1985 | Ko et al. ................. 428/900 |
| 4,546,044 | 10/1985 | Asano et al. ............. 428/425.9 |
| 4,567,109 | 1/1986 | Lehner et al. ............ 428/900 |
| 4,568,612 | 2/1986 | Lehner et al. ............ 428/900 |
| 4,860,273 | 8/1989 | Sawano et al. ............ 369/275 |

*Primary Examiner*—Paul J. Thibodeau
*Attorney, Agent, or Firm*—Keil & Weinkauf

[57] ABSTRACT

Magnetic recording media consist of a nonmagnetic base and at least one matnetizable layer which is firmly applied thereon and is based on a magnetic material finely dispersed in a binder, consisting of not less than 50% by weight of a polyurethane, and further conventional additives, wherein the magnetizable layer also contains a saturated, branched hydrocarbon.

3 Claims, No Drawings

MAGNETIC RECORDING MEDIA

The present invention relates to magnetic recording media consisting of a nonmagnetic base and at least one magnetizable layer which is firmly applied thereon and is based on a magnetic material finely dispersed in a binder, consisting of not less than 50% by weight of a polyurethane, and further conventional additives.

Magnetic recording media which are used in modern audio and video recording and playback apparatuses have to meet high requirements with regard to the recording and playback properties. Equally great value is also placed on excellent mechanical properties, in particular in the case of the magnetizable layer. These layers must be very flexible and have high resilience and high tensile strength. Furthermore, in order to avoid drops in output level, a reduction in the coefficients of friction, an increase in the abrasion resistance and resistance to wear and an improvement in the stability in tropical climates are increasingly required. In addition to the mechanical strength of the magnetizable layer, slight roughness of the surface layer is also important. As a result of this, however, thermoplastic layers may tend to stick together at as low as 30°-60° C. and high atmospheric humidity, causing the magnetic recording media to block during operation and become useless. This difficulty could only be overcome by means of rougher surfaces of the magnetizable layer, resulting in a loss of recording quality.

A number of measures have been proposed to date for avoiding the surface roughness, including, for example, the addition of water repellents during preparation of the magnetic dispersion or subsequent application to the magnetizable layer. Those preferably used are as far as possible not hydrophilic and do not tend to stick through the action of water. Increasing the surface hardness, for example by crosslinking with polyisocyanate or by radiation curing, has also been proposed. Systems which have been particularly frequently described and which are in use are those based on polyurethanes and/or blends of these polyurethanes with polyisocyanates which give harder layers and should therefore be less thermoplastic and have greater mechanical stability.

The large number of measures proposed to date frequently show considerable deficiencies with regard to process engineering, and the requirements set are generally met only unsatisfactorily or partially. Accordingly, in selecting the known systems, the aim in each case was to employ individual measures or a combination of a plurality of measures or process steps to overcome disadvantages and deficiencies, for example excessively high thermoplasticity, excessively low stability in tropical climates, excessively low abrasion resistance, too early occurrence of drops in output level due to poor properties in sustained operation, etc., or at least to have a favorable effect on the said disadvantages in one case or another. The solutions proposed to date were therefore insufficient for optimization of stability under high temperature and humidity conditions, particularly when different binder systems are used.

It is an object of the present invention substantially to improve the stability under high temperature and humidity conditions by the use of suitable additives in known magnetic recording media produced according to the prior art, in particular in those produced using very finely divided magnetic material, which have slight surface roughness, but to do so without adversely affecting the magnetic, mechanical and recording and playback properties.

We have found that this object is achieved for a magnetic recording medium, consisting of a nonmagnetic base and at least one magnetizable layer which is applied firmly thereon and is based on a magnetic material finely dispersed in a binder, consisting of not less than 50% by weight of a polyurethane, and further conventional additives, if the magnetizable layer further contains from 0.1 to 2.0% by weight, based on the amount of magnetizable material, of a saturated hydrocarbon having 16 to 40 carbon atoms and 3 to 10 branch junctions.

Saturated polyisobutenes having 16 to 32 carbon atoms and 4 to 8 branch junctions, in particular polyisobutenes which contain more than 60% of a saturated polyisobutene having 22 to 28 carbon atoms and 5 to 7 branch junctions, are particularly suitable. The other isoparaffins which satisfy the stated conditions, eg. 1,3-bisisooctylcyclohexane, are also suitable.

The additives present in the novel magnetic recording medium have good chemical stability, in particular stability to oxidation. They do not dry out or solidify and can be dissolved and emulsified. The amount added is from 0.1 to 2.0, in particular from 0.1 to 0.5,% by weight, based on the amount of magnetic material.

The magnetic recording media have a known composition and are produced in a known manner.

The magnetic material used is preferably finely divided acicular gamma-iron(III) oxide having a mean particle size of from 0.1 to 2 $\mu$m, in particular from 0.1 to 0.9 $\mu$m, or acicular chromium dioxide having the same particle structure as stated for iron oxide. Other suitable materials are gamma-iron(III) oxide doped with heavy metals, in particular with cobalt, and finely divided metal alloys of iron, cobalt and/or nickel. Finely divided chromium dioxide is particularly suitable.

The binders forming the magnetizable layer consist of not less than 50% by weight of polyurethanes. For example, solvent-containing polyurethane elastomers, as described in, for example, DE-B 11 06 959 or DE-B 27 53 694, are suitable for this purpose. Other suitable polyurethanes are disclosed in DE-A 32 26 995, 32 27 163 and 32 27 164. The polyurethanes can be used as the sole binder or, preferably, as a mixture with other polymers (eg. polyvinylformals, phenoxy resins or PVC copolymers). Preferably from 10 to 40% of the second binder component are used. A particular advantage of these binders is that additional dispersants can be completely or partially dispensed with.

Crosslinking of the magnetic recording media, which can be required depending on the binder system and property profile of the tape, is effected by reaction of the polyurethanes or polyurethane binder mixtures with polyisocyanates. A large number of organic di-, tri- or polyisocyanates or isocyanate prepolymers having molecular weights up to 10,000, preferably from 500 to 3,000, can be used for crosslinking. Preferred polyisocyanates are those which carry more than 2 NCO groups per molecule. Polyisocyanates based on toluylene diisocyanate, hexamethylene diisocyanate or isophorone diisocyanate, which are formed by polyaddition with di- or triols or by biuret and isocyanurate formation, have proven particularly suitable. An adduct of toluylene diisocyanate with trimethylolpropane and diethylene glycol is particularly advantageous. The amount of polyisocyanate used should be adapted to the particular binder system.

The solvents used are water, cyclic ethers, such as tetrahydrofuran and dioxane, or cyclic ketones, such as cyclohexanone, depending on the binder used. The polyurethanes are also soluble in other strongly polar solvents, such as dimethylformamide, N-methylpyrrolidone, dimethyl sulfoxide or ethylglycol acetate. It is also possible to mix the stated solvents with aromatics, such as toluene or xylene, or esters, such as ethyl or butyl acetate.

In general, further additives are added to the dispersions of magnetic material and binder in order to improve the magnetic layer. Examples of such additives are fatty acids, polycarboxylic acids, mono-, di- or polysulfonic acids or phosphoric acids, mixtures of these, esters or salts with metals of the first to fourth group of the Periodic Table, and waxes, lecithins, silicone oils or fluorocarbons, as well as fillers, such as carbon black, graphite, quartz powder and/or non-magnetizable silicate-based powder. Such additives are usually present in a total amount of less than 10% by weight, based on the magnetic layer.

The amount of saturated, multiply branched hydrocarbons which is typical of the novel magnetic recording media is achieved by adding these substances before or directly after the dispersing process. However, they are preferably added before the dispersing process. This allows the dispersing effect to be additionally utilized and good, uniform distribution to be achieved. If the magnetic layer is built up using further conventional additives which, in addition to other effects, such as improving the frictional properties and the leveling, also have an advantageous effect on dispersing, the advantageous properties obtained by adding the stated hydrocarbon are nevertheless retained.

The magnetizable layers are produced in a known manner. For this purpose, the magnetic material, together with the binder used and sufficient solvent, is dispersed in a dispersing apparatus, for example a tubular ball mill or a stirred ball mill, with or without the introduction of further additives. In order to obtain the advantageous binder/pigment ratio, these substances can be added to the mixture either in the solid state or in the form of 10-60% strength solutions or 20-60% strength dispersions. It has proven advantageous to continue dispersing until an extremely fine distribution of the magnetic material is achieved, which may take from 1 to 5 days. Subsequent repeated filtration gives a completely homogeneous magnetic dispersion. Any crosslinking agents required are added to the dispersion before the coating procedure.

The magnetic dispersion is then applied to the nonmagnetic base with the aid of a conventional coating apparatus, for example a knife coater. Suitable nonmagnetic bases are the conventional bases, in particular films of linear polyesters, such as polyethylene terephthalate, in general having a thickness of from 4 to 200 $\mu$m, in particular from 6 to 36 $\mu$m. Before the still liquid coating mixture is dried on the base, which is advantageously effected at from 50° to 100° C. in the course of from 0.2 to 5 minutes, the anisotropic magnetic particles are oriented along the intended recording direction by the action of a magnetic field. Thereafter, the magnetic layers can be calendered and compacted on conventional machines by being passed between heated and polished rollers, if necessary with the use of pressure and at from 20° to 100° C., preferably from 40° to 80° C.

The magnetic layer is in general from 1 to 20 $\mu$m, preferably from 2 to 12 $\mu$m, thick.

The novel magnetic recording media have improved mechanical properties while retaining the good recording and playback quality. The improved resistance to wear and stability in tropical climates, as well as the avoidance of drops in output level and the prevention of blocking of the recording media, are noteworthy.

The Examples and Comparative Experiments which follow illustrate the invention.

EXAMPLE 1

A. 108.75 g of toluylene diisocyanate, dissolved in 108 g of tetrahydrofuran, were heated to 60° C., and one drop of dibutyltin dilaurate was added. 150 g of an OH-containing polyester obtained from adipic acid and butane-1,4-diol and having a molecular weight of 1,000 and 18.6 g of ethylene glycol and 4.47 g of trimethylolpropane, dissolved in 200 g of tetrahydrofuran, were added to the solution in the course of 2.5 hours. After 1 hour, a further drop of dibutyltin dilaurate was added. After an NCO content of 1.78% had been reached, the mixture was cooled to 45° C., after which 26.25 g of diethanolamine were added. The resulting product had a solids content of 50%, an OH number of 91 and a K value (2% strength in dimethylformamide) of 24.

B. 102 kg of tetrahydrofuran, 31 kg of a 50% strength solution of the polyureaurethane stated under A, 100 kg of a ferromagnetic chromium dioxide having a mean needle length of 0.5 $\mu$m, 0.5 kg of a polyisobutene having 5 to 7 branching points and 24 to 28 carbon atoms, 2 kg of zinc stearate, 0.15 kg of a commercial silicone oil and 0.5 kg of N-tallow fat-1,3-diaminodioleate were introduced into a steel ball mill having a capacity of 600 parts by volume and containing 600 kg of steel balls of 4-6 mm diameter, and the mixture was dispersed for 36 hours. The dispersion was then filtered under superatmospheric pressure and, directly before application to an 11.5 $\mu$m thick polyethylene terephthalate film, was provided, while stirring, with 0.039 part, per part of the dispersion, of a 75% strength solution of a triisocyanate based on 3 moles of toluylene diisocyanate and 1 mole to trimethylolpropane. The coated film was passed through a magnetic field to align the magnetic particles and was then dried at from 50° to 90° C. and calendered by being passed between heated rollers under pressure (60° C., nip pressure 200 kg/cm).

The ratio of the residual induction in the playing direction to that in the crosswise direction was measured in an external magnetic field of 160 kA/m and gave an orientation ratio of 3.0.

After the coated film had been slit into 3.81 mm wide magnetic tapes, the following tests were carried out:

TEST 1

The surface roughness was determined as the average peak-to-valley height $R_Z$ (in $\mu$m) according to DIN 4768, Sheet 1.

TEST 2

The coefficients of friction (layer/steel) were determined according to DIN 45,522, Sheet 1.

TEST 3

Dynamic friction. The coefficient of friction was determined by measuring a tensile force produced as a result of friction by a magnetic tape passed over a measuring drum rotating at a peripheral speed of 9.5 cm/s.

The measuring drum was a steel drum having a surface roughness of about 0.15 μm and a diameter of 70 mm. The piece of tape was 25 cm long and was passed over the drum under a tape tension of 20 cN at a speed of 1 mm/s and with an angle of wrap of 180° C. The tension at the load cell F was a measure of the coefficient of friction μ, in accordance with $$\mu = \frac{1-}{\pi} \cdot \ln \frac{F}{20}.$$

TEST 4

Uniformity of signal level. The uniformity of signal level was tested during 100 passes of a test tape on which an 8 kHz signal had been recorded at the particular bias setting of the tape. The number of passes before the first drop in output level greater than 2 dB is stated. 100 means no drop in output level during the test.

TEST 5

Environmental test. 10 cassettes containing a magnetic tape were stored for 4 weeks at 40° C. and 93% relative humidity and then tested in the playback mode at 30° C. and 90% relative humidity. Thereafter, the deposits on the erase head, the audio head and the capstan were evaluated visually. The thickness of the deposits were recorded on the basis of a scale of marks (from mark 1: no deposit to mark 6: very thick deposit) and the mean value was calculated.

TEST 6

Coating shed on paper. To test for coating shed on paper, three tape loops, each having a length of 840 mm, were operated on a drive at a tape speed of 225 mm/s. The layer side of the tape was drawn under a tape tension of 50 cN over a clamped piece of paper having a defined surface structure. After 75 cycles, or 10 minutes, the measurement was complete. The discoloration of the paper (for the scale of marks cf. Test 5) due to tape abrasion is a measure of the abrasion resistance of the tape.

The results of the measurements are shown in the Table.

COMPARATIVE EXPERIMENT 1

The procedure was similar to that described in Example 1, except that polyisobutene was not added. The results of the measurements are shown in the Table.

EXAMPLE 2

A. 53.1 g of toluylene diisocyanate and 75 g of diphenylmethyl diisocyanate, dissolved in 229 g of tetrahydrofuran, were heated to 60° C. and one drop of dibutyltin dilaurate was added. 250 g of an OH-containing polyester obtained from adipic acid and butanediol and 1.34 g of trimethylolpropane, dissolved in 200 g of tetrahydrofuran, were added to the solution in the course of 2.5 hours. After one hour, a further drop of dibutyltin dilaurate was added. After an NCO content of 1.05% had been reached, the mixture was cooled to 45° C., after which 22.05 g of diethanolamine were added. The resulting product had a solids content of 50%, an OH number of 55 and a K value (2% strength in dimethylformamide) of 30.

B. Production of the magnetic recording medium using the polyurethane stated under 2A was carried out as described in Example 1.

The results of the measurements are shown in the Table.

COMPARATIVE EXPERIMENT 2

The procedure was similar to that described in Example 2, except that polyisobutene was not added.

The results of the measurements are shown in the Table.

EXAMPLE 3

A. 6,600 parts of a polyester obtained from adipic acid and butanediol (molecular weight 1,100), 730 parts of butanediol, 80 parts of trimethylolpropane, 3,862 parts of diphenylmethane 4,4'-diisocyanate were dissolved in 26,000 parts of tetrahydrofuran and heated to 55° C. in a heatable reaction vessel having a capacity of 150,000 parts by volume and equipped with a stirrer and a reflux condenser. The components were reacted to a final viscosity of 25 Pa.s, and then diluted to a solids content of 12.5% with 52,900 parts of tetrahydrofuran. At the same time, the reaction was stopped by adding 50 parts of dibutylamine. The K value of the resulting polymer was 63, measured in 1% strength solution in dimethylformamide.

B. 100,000 parts of steel balls, 16,000 parts of the 12.5% strength solution of the polyurethane elastomer stated under 3A, 10,000 parts of a 10% strength solution of polyvinylformal, consisting of 82% of vinylformal units, 12% of vinyl acetate units and 6% of vinyl alcohol units, 135 parts of N-tallow fat-1,3-diaminodioleate, 270 parts of zinc stearate, 40 parts of a polyisobutene having 5 to 7 branching points and 24 to 28 carbon atoms and 13,500 parts of a ferromagnetic chromium dioxide pigment having a mean particle size of 0.5 μm and a length/width ratio of from 4:1 to 9:1 and 4,500 parts of tetrahydrofuran were introduced into a steel ball mill having a capacity of 100,000 parts by volume and operated at about 40 rpm, and the mixture was dispersed for about 120 hours. The magnetic dispersion was then passed under superatmospheric pressure through a filter of 5 μm pore size. A 20 μm thick polyethylene terephthalate film was coated with the magnetic dispersion by a conventional method using a knife coater, the coated film was passed through a magnetic field and the coating was then dried at from 60° to 100° C. The magnetic layer was compacted and calendered by being passed between heated rollers (70° C., nip pressure 200 kg/cm). The resulting thickness was 5 μm. The coated film was then slit into 3.81 mm wide tapes.

The results of the measurements are shown in the Table.

COMPARATIVE EXPERIMENT 3

The procedure was similar to that described in Example 3, except that polyisobutene was not added.

The results of the measurements are shown in the Table.

TABLE

| Test No. | Example 1 | Example 2 | Example 3 | Comparative Experiment 1 | Comparative Experiment 2 | Comparative Experiment 3 |
| --- | --- | --- | --- | --- | --- | --- |
| 1 | 0.18 | 0.17 | 0.22 | 0.28 | 0.26 | 0.28 |
| 2 | 0.22 | 0.21 | 0.26 | 0.35 | 0.4 | 0.35 |
| 3 | 0.24 | 0.22 | 0.28 | 0.3 | 0.26 | 0.32 |
| 4 | 100 | 100 | 100 | 80 | 48 | 100 |
| 5 | 1.2 | 1.4 | 1.8 | 1.9 | 2.2 | 2.4 |
| 6 | 5 | 4 | 5 | 6 | 5 | 6 |

We claim:

1. A magnetic recording medium, consisting of a nonmagnetic base and at least one magnetizable layer which is applied firmly thereon and which comprises a magnetic material finely dispersed in a binder, said binder containing not less than 50% by weight of a polyurethane, wherein the magnetizable layer further contains from 0.1 to 2.0% by weight, based on the amount of magnetizable material, of an isoparaffin having 16 to 40 carbon atoms and 3 to 10 branch junctions.

2. A magnetic recording medium as defined in claim 1, wherein the magnetizable layer contains from 0.1 to 2.0% by weight, based on the amount of magnetizable material, of a saturated polyisobutene having 16 to 32 carbon atoms and 4 to 8 branch junctions.

3. A magnetic recording medium as defined in claim 2, wherein the polyisobutene consists of more than 60% of a saturated polyisobutene having 22 to 28 carbon atoms and 5 to 7 branch junctions.

* * * * *